(12) United States Patent
Martin et al.

(10) Patent No.: US 6,272,551 B1
(45) Date of Patent: *Aug. 7, 2001

(54) NETWORK ADAPTER FOR TRANSMITTING NETWORK PACKETS BETWEEN A HOST DEVICE AND A POWER LINE NETWORK

(75) Inventors: Philip W. Martin, Banks; Nelson Lee Yaple, Portland, both of OR (US)

(73) Assignee: Intel Corporation, Santa Clara, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/056,790

(22) Filed: Apr. 8, 1998

(51) Int. Cl.⁷ ..................................................... G06F 13/00
(52) U.S. Cl. ......................... 709/250; 709/236; 370/419; 370/466
(58) Field of Search .................................... 709/230, 236, 709/237, 246, 249, 250, 313, 321; 370/389, 395, 419, 420, 465, 466, 467, 474

(56) References Cited

U.S. PATENT DOCUMENTS

| | | | | |
|---|---|---|---|---|
| 4,815,106 | * | 3/1989 | Propp et al. | 375/257 |
| 5,073,852 | * | 12/1991 | Siegel et al. | 709/300 |
| 5,136,584 | * | 8/1992 | Hedlund | 370/399 |
| 5,634,015 | * | 5/1997 | Chang et al. | 710/129 |
| 5,659,684 | * | 8/1997 | Giovannoni et al. | 709/250 |
| 5,666,487 | * | 9/1997 | Goodman et al. | 709/246 |
| 5,943,319 | * | 8/1999 | Fraser | 370/259 |
| 5,982,783 | * | 11/1999 | Frey et al. | 370/467 |

* cited by examiner

*Primary Examiner*—Viet D. Vu
(74) *Attorney, Agent, or Firm*—Kenyon & Kenyon

(57) ABSTRACT

A method for transmitting a network packet formatted in accordance with a given communication protocol over a network operating in accordance with a different communication protocol is provided. According to this method, a network packet formatted in accordance with a given communication protocol associated with a first network type is received from a host device. The network packet is then translated into a network packet that is compatible with a different communication protocol associated with a second network type. The translated network packet is then transmitted over the network of the second network type.

13 Claims, 6 Drawing Sheets

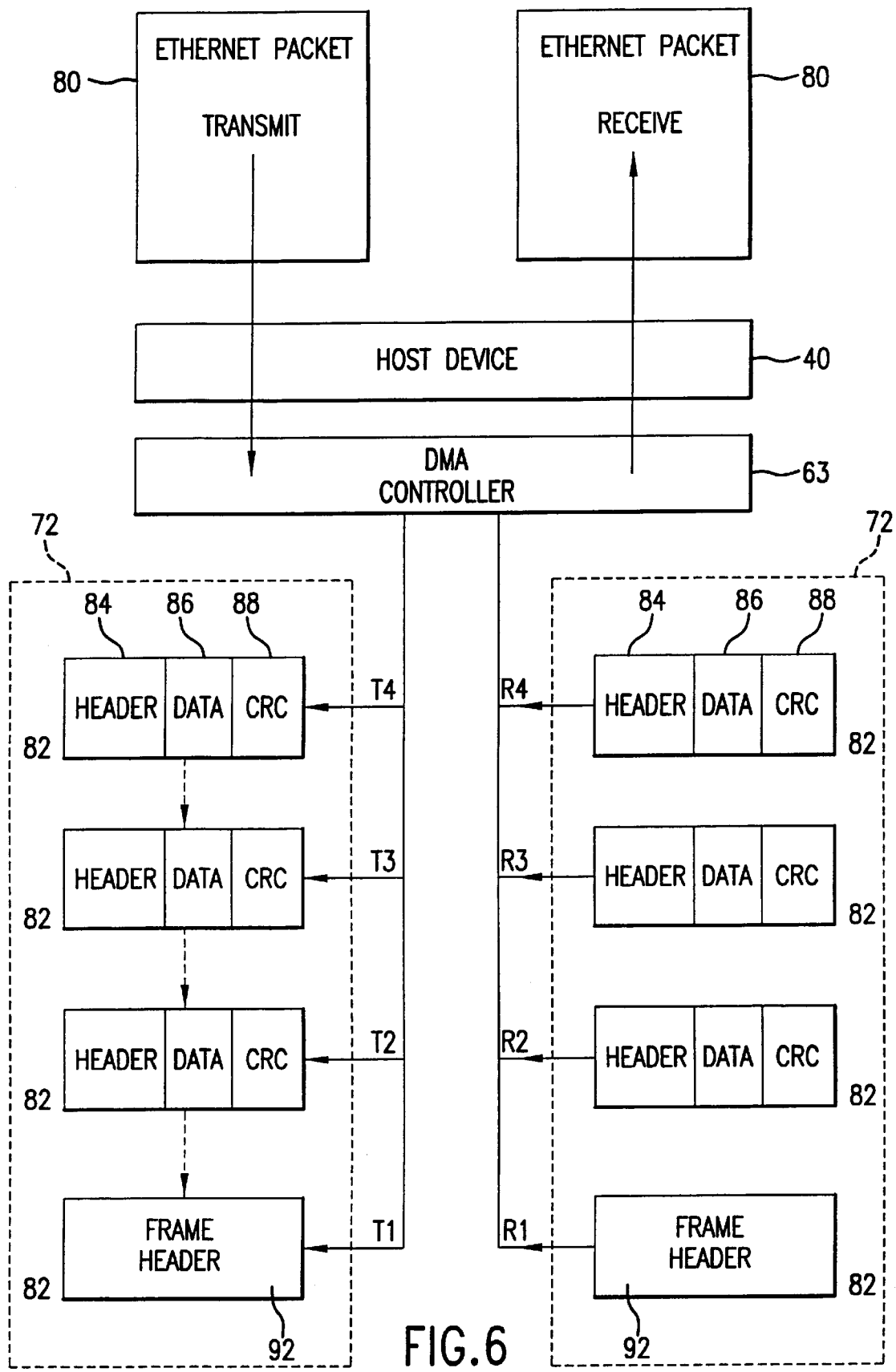

NETWORK ADAPTER FOR TRANSMITTING NETWORK PACKETS BETWEEN A HOST DEVICE AND A POWER LINE NETWORK

FIELD OF THE INVENTION

The present invention relates generally to the field of computer networking, and in particular to a transparent method for transmitting a network packet formatted in accordance with a first protocol over a network that operates in accordance with a second, different protocol.

BACKGROUND OF THE INVENTION

A personal computer (PC) that is to be used for communicating over a network is generally loaded with specialized software, known as a Network Operating System (NOS), that governs the manner in which higher-level processes, such as user applications, interact with the network. The NOS, in turn, interacts with lower-level processes, called network drivers, that are responsible for governing the actual transmission and receipt of data between the PC and the network.

Most common NOS software developed for use in PCs, such as that distributed by Microsoft® and Novell®, require that the network drivers with which they interact identify the type of network over which that network driver will be communicating. The NOS uses this information to format network packets to be transmitted over the network before passing them to the network driver. More specifically, the NOS uses the network type information to build Media Access Control (MAC) headers in the network packet, thereby ensuring that the network packet has the proper format for transmission over the network.

The major distributors of NOS software configure their programs to accept only a limited variety of network types, corresponding to the most widely-implemented network protocols. Thus, the most common NOS software on the market today is generally configured to work only with Ethernet, Token Ring, and ATM network protocols. This means that if a network driver informs the NOS that it is configured to communicate over some other type of network, the NOS will not be able to interact with that network driver absent some programming change.

For a variety of reasons, it is not realistic to expect that the major NOS vendors will readily change their software to accommodate a new network type and distribute such changes throughout their existing customer base. Accordingly, there is a need for a method of allowing a network driver to interact with existing NOS software where the network driver is configured to communicate over a network of a type not supported by that NOS software. Moreover, the method should be transparent to the NOS software.

SUMMARY OF THE INVENTION

Embodiments of the present invention provide methods for transmitting a network packet formatted in accordance with a given communication protocol over a network operating in accordance with a different communication protocol. According to one such embodiment, a network packet formatted in accordance with a given communication protocol associated with a first network type is received from a host device. The network packet is then translated into a network packet that is compliant with a different communication protocol associated with a second network type. The translated network packet is then transmitted over the network of the second network type.

BRIEF DESCRIPTION OF THE DRAWINGS

FIG. 6 is a block diagram illustrating encapsulation and de-encapsulation of a network packet in accordance with the embodiment illustrated in FIG. 5.

DETAILED DESCRIPTION

Embodiments of the present invention are directed to providing a transparent method enabling an existing Network Operating System (NOS) to interface with a network of a type unknown to that NOS. In accordance with one particular embodiment, for example, a network packet formatted by an NOS in accordance with a known network protocol, such as the Ethernet network protocol (defined in IEEE Std. 802.3-1996), is transparently translated by a network adapter for transmission over a network operating in accordance with a protocol unknown to the NOS, such as a power line network. Conversely, a previously-translated network packet received by such a network adapter may be retranslated and provided to the NOS, which may then process the network packet using its existing processing logic. This and other embodiments are described below.

Figure 1:
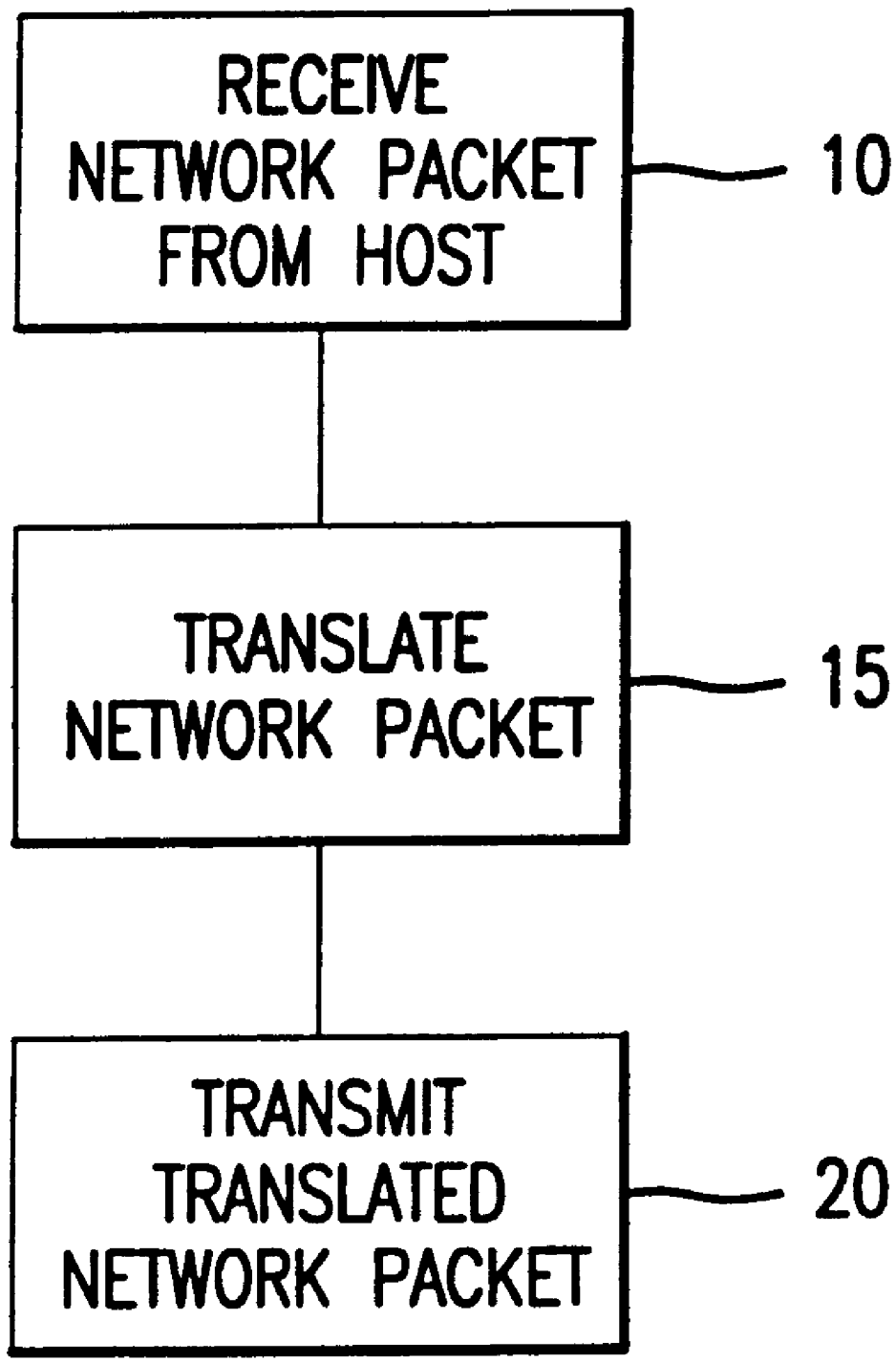
FIG. 1 is a flow chart illustrating a method for transmitting a network packet received from a host over a network of a type unknown to the host in accordance with an embodiment of the present invention.

Referring now to FIG. 1, in accordance with a first embodiment of the present invention, a method is provided for transmitting a network packet formatted by an NOS in accordance with a known network protocol over a different type of network that is not known to the NOS. In this particular embodiment, a network packet is received from a host (Step 10). The network packet is then translated into a network packet compliant with a different network protocol (Step 15). This translation may be accomplished, for example, by encapsulating the network packet within a data structure that complies with a protocol associated with the different network type by adding address and/or header information specific to the different network type. The translated network packet is then transmitted over the network (Step 20).

Figure 2:
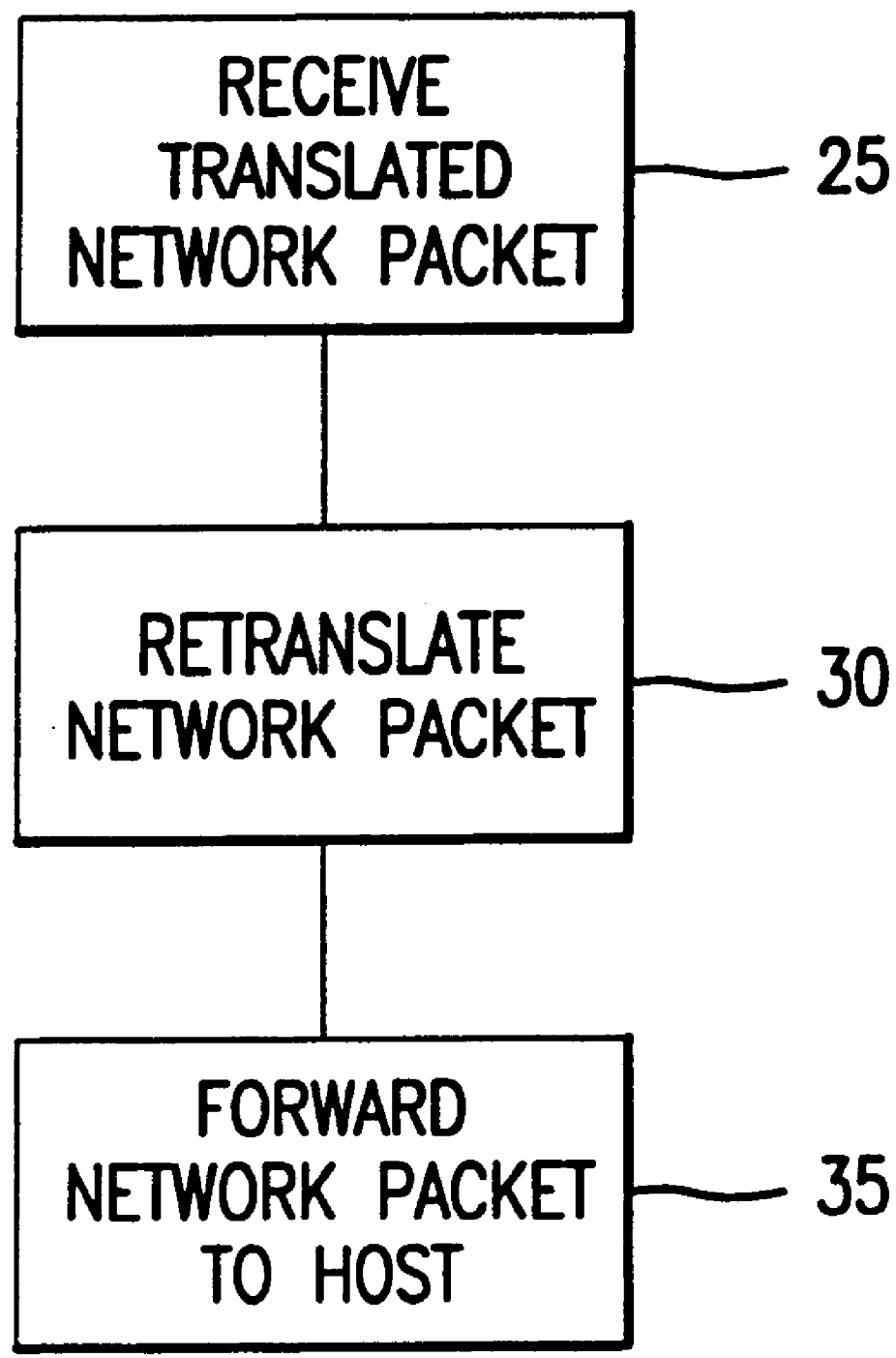
FIG. 2 is a flow chart illustrating the converse of the method shown in FIG. 1, whereby a network packet received from a network is formatted for processing by a host.

FIG. 2 illustrates the converse of the method shown in FIG. 1. In this particular embodiment, a previously-translated network packet is received from the network (Step 25). The translated network packet is then retranslated by, for example, removing address and/or header information specific to the type of network over which the network packet was transmitted (Step 30). The de-encapsulated network packet is then passed to the host for processing (Step 35).

As discussed further below, the embodiment illustrated in FIG. 1 and FIG. 2 enables data to be transmitted over a network of a type that is unknown to the host's NOS without requiring any changes to the NOS itself. In other words, embodiments of the present invention facilitate communication over new types of networks using existing NOS software. Such embodiments may be implemented in a variety of different devices for transmission of network packets.

Figure 3:
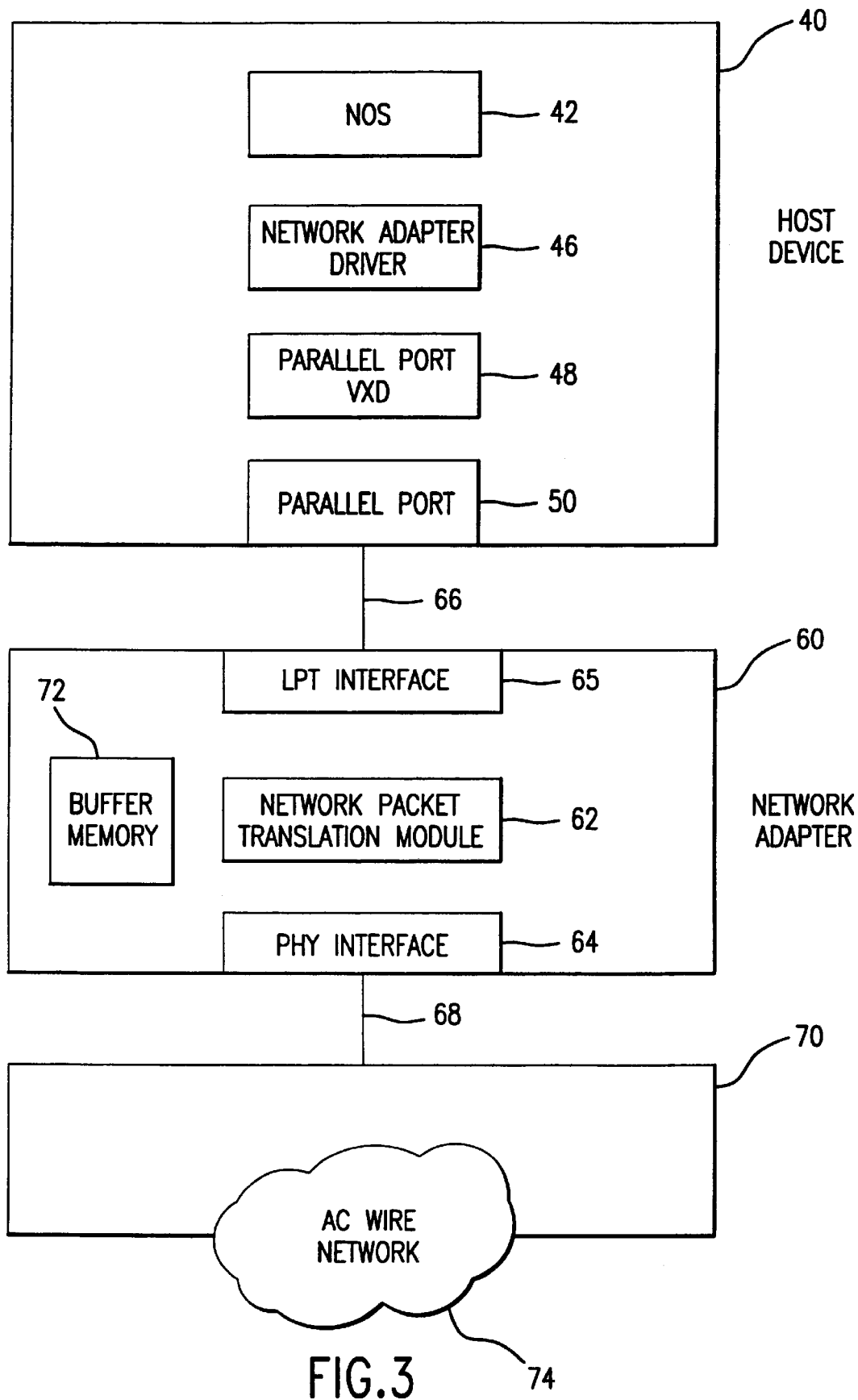
FIG. 3 is a block diagram illustrating a computer system that may be used to implement the method shown in FIG. 1 and FIG. 2 in accordance with an embodiment of the present invention.

Referring now to FIG. 3, embodiments of the present invention may be implemented, for example, in a system comprising a host device 40 and a network adapter 60. Host device 40 may comprise a desktop personal computer, a laptop computer, a network computer (NC), a hand-held device (e.g., Palm Pilot™), a command console, or any other data processing device capable of communicating over a network. Host device 40 is coupled to network adapter 60 by a first communications link 66. First communications link 66 may comprise, for example, a standard cable for carrying digital transmissions, such as a cable of the type commonly used to connect a PC to a printer. Network adapter 60 is in turn coupled to a network communications medium 70 by a second communications link 68.

In this particular embodiment, network communications medium 70 is an element of a power line network 74, and network communications medium 70 comprises standard power lines. Thus, second communications link 68 may comprise a power cable plugged into a standard wall socket. It should be noted, however, that the present invention is not intended to be limited to use only with power line networks. For embodiments directed to other types of networks, second communications link 68 and network communications medium 70 may vary in accordance with requirements particular to those network types.

In the embodiment shown in FIG. 3, host device 40 includes a Network Operating System (NOS) 42. NOS 42 may comprise software programmed to manage network communications for applications running on host device 40, such as an e-mail application or an Internet browser. NOS 42 is configured to interface with a network through a network adapter driver 46. In this embodiment, network adapter driver 46 is an NDIS (Network Driver Interface Specification) driver, which is a common driver interface for communicating between hardware and protocol stacks (e.g., TCP/IP). In a typical prior art configuration, such an NDIS driver might communicate with a network interface card (not shown) installed in host device 40. In this particular embodiment, however, host device 40 is configured to send and receive network traffic through parallel port (LPT) 50. To accomplish this, host device 40 includes a parallel port VxD (virtual device driver) 48 arranged between network adapter driver 46 and parallel port 50. As is known in the art, a VxD is a 32-bit Ring 0 device driver that is typically used to manage a system resource, such as a hardware device or installed software, so that more than one application can use the resource at the same time.

Network adapter driver 46 may be implemented, for example, as a software module including executable instructions for facilitating the repackaging and moving of data between network protocol stacks (not shown) of host device 40 and network adapter 60. In addition, in the particular embodiment shown in FIG. 3, parallel port VxD 48 may include instructions for processing printer data directed to parallel port 50 by, for example, applications running on host device 40. Parallel port VxD 48 is responsible for controlling all access to the I/O registers and LPT APIs (Application Program Interfaces) associated with parallel port 50. In addition, parallel port VxD 48 acts as a gateway to network adapter 60. Network adapter driver 46 may provide access to parallel port VxD 48 by creating a direct callable interface, allowing both network and printer data to be handled by parallel port VxD 48 directly.

Where host device 40 is running a Windows®95 operating system, network adapter driver 46 may be modeled on an NDIS 3.x MAC (Media Access Control) driver. Such a configuration enables network adapter driver 46 to directly interface to parallel port VxD 48, and permits the use of commonly-shipped Windows®95 protocol stacks, redirectors, and other Windows®95 interfaces for networking (e.g., file sharing, print sharing, Internet sharing). Where host device 40 is running a Windows®3.x or DOS operating system, network adapter driver 46 may be modeled on a common IPX.COM driver used in DOS and early Windows® environments, since IPX.COM interfaces readily with minimal memory footprint. Persons skilled in the art will recognize that other driver models may also be used, both for the above-mentioned operating system environments and other environments, and the present invention is not intended to be limited in this regard.

In the particular embodiment shown in FIG. 3, network adapter 60 comprises a device configured to provide connectivity between host device 40 and power line network 74. Network adapter 60 includes a network packet translation module 62, a buffer memory 72, and a PHY (Physical layer) interface 64. Network packet translation module 62 may comprise, for example, firmware configured to perform memory management functions related to the translation and retranslation of network packets, as described further below. PHY interface 64 provides the physical connection to network communications medium 70 through second communications link 68. PHY interface 64 may comprise, for example, hardware of a type known in the art that ensures the signals applied to network communications medium 70 from network adapter 60 comply with the appropriate Physical-layer protocol (referring to the 7-layer Open Systems Interconnection (OSI) Reference Model defined by the International Standards Organization (ISO)).

Network adapter 60 is configured to provide host device 40 with network connectivity through parallel port 50. Accordingly, network adapter 60 includes a parallel port (LPT) interface 65. In other embodiments, network adapter 60 may include interfaces adapted to provide network connectivity through a PCI (peripheral component interconnect) bus, a Universal Serial Bus (USB), an ISA (Industry Standard Architecture) bus, and so on, thereby eliminating any need to coordinate shared use of parallel port 50 for network communications and other processes of host device 40, such as printer communications.

Figure 4:
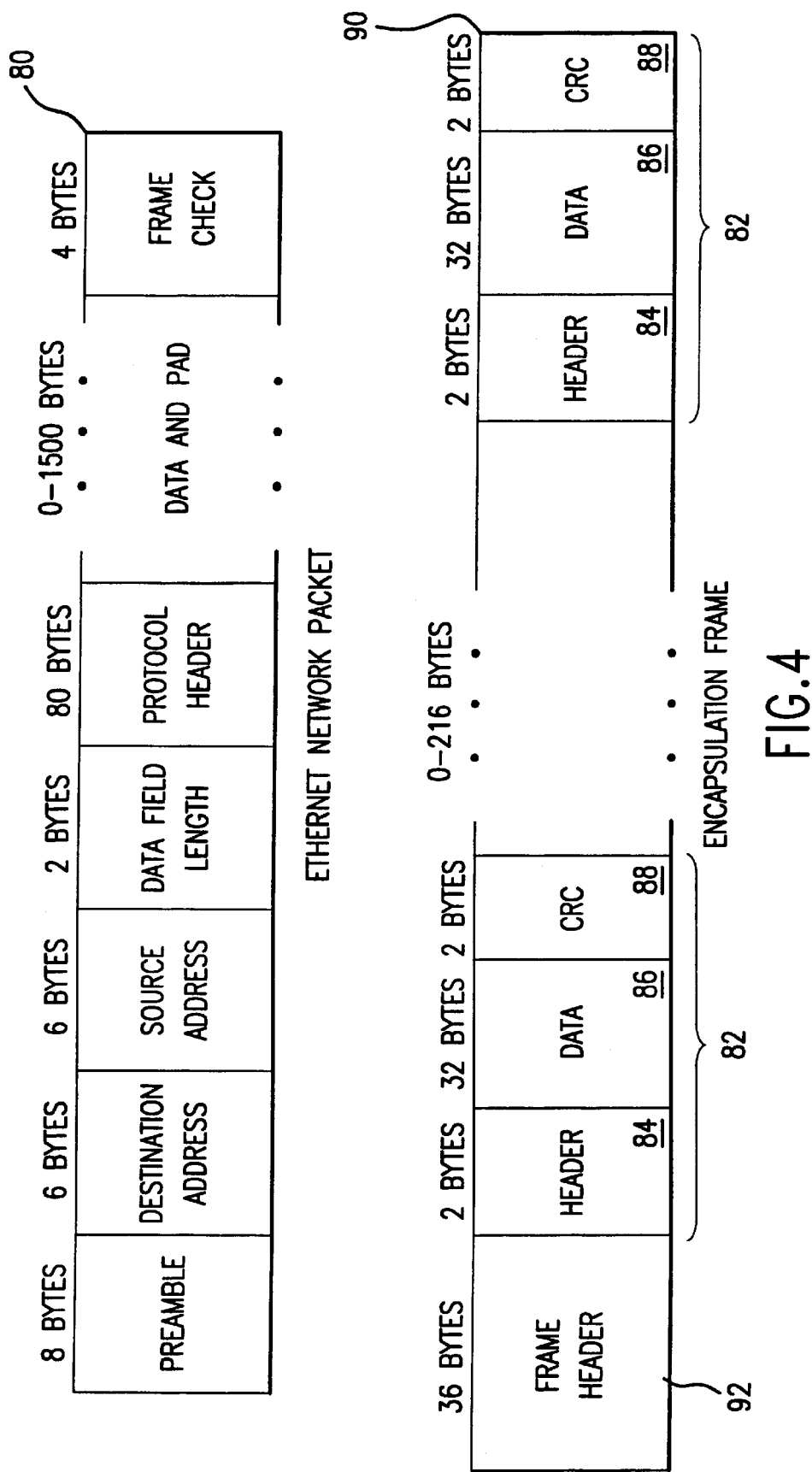
FIG. 4 illustrates examples of a network packet and an encapsulation frame that may be processed in accordance with embodiments of the present invention.

Looking more closely at network adapter 60 in the embodiment shown in FIG. 3, network packet translation module 62 may use buffer memory 72 to implement an encapsulation and de-encapsulation scheme. To illustrate the operation of network adapter 60, assume host device 40 has a network packet to transmit to another device over power line network 74. Further assume that the network packet is a standard Ethernet frame formatted in accordance with IEEE Std. 802.3, as is well known in the art. This example is illustrated in FIG. 4.

Network packet 80 will have been formatted by NOS 42 and passed through NDIS 44 to network adapter driver 46, which will in turn pass network packet 80 to parallel port VxD 48. In a configuration where host device 40 uses parallel port 50 for both network and printer communications, network adapter driver 46 may append an identifier to network packet 80 to inform network adapter 60 as to the type of data being sent. In any event, parallel port VxD 48 routes network packet 80 to parallel port 50. Network packet 80 is then carried over first communications link 66 to LPT interface 65 of network adapter 60, where it may then be read by network packet translation module 62.

In this embodiment, network packet translation module 62 translates network packet 80 for transmission over power line network 74. Network packet translation module 62 segments network packet 80 into a series of linked blocks 82 maintained in buffer memory 72. As shown in FIG. 4, each block 82 is 36 bytes long, and comprises a 2-byte header field 84, a 32-byte data field 86, and a 2-byte CRC (cyclical redundancy check) field 88 used for error checking. Network packet translation module 62 uses these blocks to build encapsulation frames 90 compliant with the communications protocol associated with power line network 74. As shown, each encapsulation frame 90 also includes a 36-byte frame header 92 that may be used, for example, by a receiving host device to identify encapsulation frame 90 as a translated network packet. In this embodiment, each encapsulation frame 90 is between 2 blocks (72 bytes) and 9 blocks (324 bytes) in length. Since an Ethernet packet may be as much as 1514 bytes in length, as many as 5 encapsulation frames 90 may be used to encapsulate a single network packet 80. It should be noted, however, that the particular formats and lengths discussed herein are merely exemplary, and may be varied without departing from the scope of the present invention.

Figure 5:
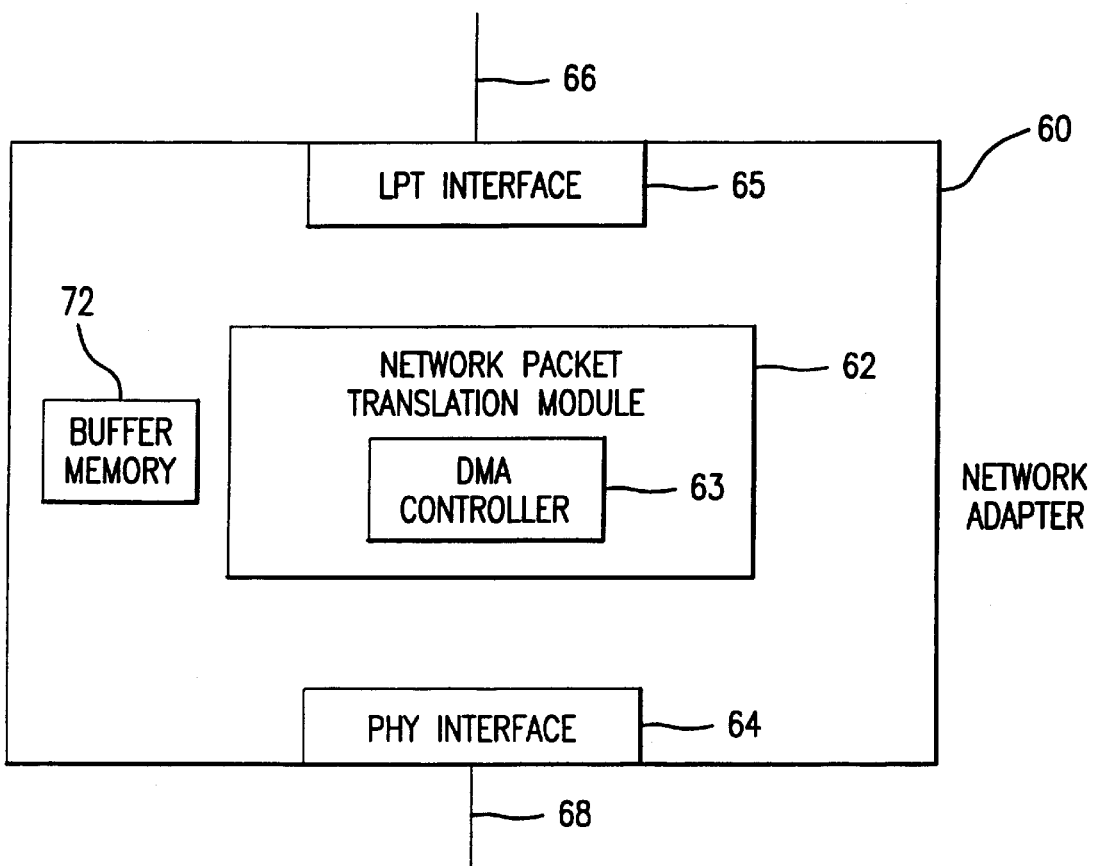
FIG. 5 is a block diagram illustrating a possible variation of the network adapter shown in FIG. 3, wherein the network adapter is fitted with a Direct Memory Access controller.

Referring now to FIG. 5, in accordance with a variation on the embodiment illustrated in FIG. 3, network packet translation module 62 may comprise a DMA (Direct Memory Access) controller 63. In this particular embodiment, DMA controller 63 comprises firmware within network adapter 60, but the functionality of DMA controller 63 could readily be implemented in software, hardware, or some combination of firmware, software and/or hardware.

When network adapter 60 is initialized, buffer memory 72 is logically divided into a series of blocks that are linked to one another. Such a linked series of blocks may be implemented, for example, by having DMA controller 63 maintain an address list (not shown) with an entry for each block in buffer memory 72. Each of these entries includes an address in buffer memory 72 identifying the beginning of the block, as well pointers to the previous and next blocks in the linked series. In such an arrangement, a null address for the previous block would indicate the first block in the linked series.

In the embodiment illustrated in FIG. 5, DMA controller 63 is responsible for writing the data from a network packet 80 into blocks in buffer memory 72. For example, and with further reference to FIG. 6, upon receiving a network packet 80 from host device 40, DMA controller 63 determines the length of network packet 80 and allocate an appropriate number of blocks 82 in buffer memory 72. In the example shown in FIG. 6, 4 blocks 82 are allocated (associated with data flows T1 through T4, respectively). DMA controller 63 will then sequentially copy 32-byte segments from network packet 80 into the data fields 86 of respective blocks 82 until the entirety of network packet 80 has been encapsulated. As each data field 84 is filled, the firmware will update header field 84 and CRC field 88 appropriately to facilitate de-encapsulation by the recipient. Once network packet 80 has been fully encapsulated, the firmware inserts appropriate addressing and block header information in frame header 92 contained in the first block 82. DMA controller 63 then sequentially writes the linked series of blocks 82 to PHY interface 64, which applies signals representing the data contained in the linked series of blocks 82 to second communications link 68 for transmission over power line network 74. As each block 82 is successfully transmitted by PHY interface 64, that block 82 is returned to the list of blocks 82 available for encapsulation of additional network packets 80.

Essentially the converse of the process just described is used to de-encapsulate data received by network adapter 60 from power line network 74, as is also illustrated in FIG. 6. That is, the received data is saved as a linked series of blocks 82 in buffer memory 72. Once a complete list is received (a complete list is all of the blocks 82 that make up a given network packet 80), DMA module 63 gathers the data field 86 from each of the blocks 82 into a single contiguous stream of data. This stream, then, comprises the complete network packet 80, without the data specific to the protocol associated with power line network 74. Network adapter 60 may then pass this contiguous stream of data to host device 40 through parallel port 50, where network packet 80 is ultimately passed to the appropriate recipient application.

Persons skilled in the art will recognize from the foregoing description that many alternatives, modifications and/or variations of the disclosed embodiments are possible. For example, embodiments of the present invention may readily be applied to networks other than power line networks. Similarly, the present invention is by no means limited to encapsulation and de-encapsulation of Ethernet network packets, but rather may be used to provide transparent translation of virtually any format of network packet.

The foregoing is a detailed description of particular embodiments of the present invention. The invention, however, also embraces all alternatives, modifications and variations that fall within the letter and spirit of the claims, as well as all equivalents of the claimed subject matter.

What is claimed:

1. A network adaptor enabling a host device to transmit network packets configured in accordance with a first network communication protocol over a power line network that operates in accordance with a second network communication protocol, the network adaptor comprising:

a first interface for exchanging network packets with a host device over a first communications link between said first interface and a parallel port of the host device, the network packets being configured in accordance with the first network communication protocol;

a second interface for exchanging network packets with a power line network infrastructure over a second communications link, the power line network operating in accordance with the second network communication protocol different from the first network communication protocol; and a network packet translation module coupled to said first and second interfaces, the network packet translation module being configured to translate network packets between the first and second network communication protocols by selectively encapsulating a network packet compliant with the first network communication protocol within a data structure compliant with the second network communication protocol, or decapsulating a network packet compliant with the first network communication protocol from within a data structure compliant with the second network communication protocol.

2. The network adapter of claim 1, wherein the communications medium comprises standard power lines.

3. The network adapter of claim 2, wherein the communications medium comprises a power cable plugged into a standard wall socket.

4. The network adapter of claim 1, wherein said network packet translation module comprises firmware.

5. The network adapter of claim 1, wherein said network packet translation module comprises hardware.

6. The network adapter of claim 2, wherein said second network communication protocol comprises a protocol for communicating over a power line network.

7. The network adapter of claim 6, wherein said first network communication protocol comprises a protocol for communicating over an Ethernet network.

8. The network adapter of claim 6, wherein said first network communication protocol comprises a protocol for communicating over a Token Ring network.

9. The network adapter of claim 6, wherein said first network communication protocol comprises a protocol for communicating over an ATM network.

10. The network adapter of claim 1, further comprising a buffer memory accessible by said network packet translation module.

11. The network adapter of claim 10, wherein said buffer memory is segmented into a plurality of linked blocks.

12. The network adapter of claim 11, wherein said data structure compliant with a second network communication protocol comprises two or more of said plurality of linked blocks, with said network packet being segmented into at least a subset of said two or more linked blocks.

13. The network adapter of claim 12, wherein said data structure further comprises header information specific to said second network communication protocol.

* * * * *